US012644778B2

(12) United States Patent
    Aldag et al.

(10) Patent No.: US 12,644,778 B2
(45) Date of Patent: Jun. 2, 2026

(54) SYSTEMS AND METHODS FOR MONITORING TEMPERATURE IN AN ELECTRICAL PANEL

(71) Applicant: Vertiv IT Systems, Inc., Huntsville, AL (US)

(72) Inventors: Philip Robert Aldag, Columbus, OH (US); Kevin R. Ferguson, Dublin, OH (US); Todd Christopher Marchal, Dublin, OH (US); Michael Thomas Oller, Delaware, OH (US)

(73) Assignee: Vertiv IT Systems, Inc., Columbus, OH (US)

( * ) Notice: Subject to any disclaimer, the term of this patent is extended or adjusted under 35 U.S.C. 154(b) by 378 days.

(21) Appl. No.: 18/351,856

(22) Filed: Jul. 13, 2023

(65) Prior Publication Data

US 2024/0019313 A1    Jan. 18, 2024

Related U.S. Application Data

(60) Provisional application No. 63/389,526, filed on Jul. 15, 2022.

(51) Int. Cl.
    G01K 1/14        (2021.01)
    G01K 1/02        (2021.01)
                (Continued)
(52) U.S. Cl.
    CPC .............. G01K 1/14 (2013.01); G01K 1/026 (2013.01); H01H 71/02 (2013.01); H01H 71/04 (2013.01);
                (Continued)
(58) Field of Classification Search
    CPC ............ G01K 1/026; G01K 1/14; G01K 3/06; G01K 2217/00; H01H 71/02; H01H 71/04; H01H 71/125; H02B 1/056
    See application file for complete search history.

(56) References Cited

U.S. PATENT DOCUMENTS

| | | | |
|---|---|---|---|
| 6,227,502 B1 | 5/2001 | Derman | |
| 6,839,212 B2 | 1/2005 | Simms et al. | |

(Continued)

FOREIGN PATENT DOCUMENTS

| | | |
|---|---|---|
| CN | 103367939 A | 10/2013 |
| JP | 2002081998 A | 3/2002 |

(Continued)

OTHER PUBLICATIONS

European Patent Application 23185490.2—Extended European Search Report dated Dec. 4, 2023. (D11001EP).

*Primary Examiner* — Randy W Gibson
(74) *Attorney, Agent, or Firm* — Dickinson Wright PLLC

(57)                ABSTRACT

A method for monitoring temperature includes receiving, via at least one connector of a slotted assembly disposed in an electrical panel, data from at least one of a wire temperature probe and a one ambient temperature probe associated with the slotted assembly, the wire temperature probe being configured to sense a temperature of a corresponding load wire associated with at least one electrical breaker of the electrical panel, and the ambient temperature probe being configured to sense an ambient temperature associated with the slotted assembly. The method also includes determining, based on the data from at least one of the wire temperature probe and the ambient temperature probe, a condition of one of the at least one electrical breaker and the electrical panel. The method also includes generating an output indicating the condition of the at least one of the at least one electrical breaker and the electrical panel.

14 Claims, 3 Drawing Sheets

(51) Int. Cl.

| | | |
|---|---|---|
| *H01H 71/02* | (2006.01) | |
| *H01H 71/04* | (2006.01) | |
| *H01H 71/12* | (2006.01) | |
| *H02B 1/056* | (2006.01) | |

(52) U.S. Cl.

CPC ....... *H01H 71/125* (2013.01); *G01K 2217/00* (2013.01); *H02B 1/056* (2013.01)

(56) References Cited

U.S. PATENT DOCUMENTS

| | | | |
|---|---|---|---|
| D568,723 S | 5/2008 | Morgan | |
| 7,495,876 B2 | 2/2009 | Dunne et al. | |
| 7,821,411 B1 | 10/2010 | Dunne et al. | |
| D638,690 S | 5/2011 | Hoek | |
| 8,139,337 B2 | 3/2012 | Baxter et al. | |
| D728,349 S | 5/2015 | Lake | |
| 9,293,793 B2 | 3/2016 | Park et al. | |
| 9,520,710 B2 | 12/2016 | Zhou et al. | |
| 10,109,980 B2 | 10/2018 | Koda et al. | |
| 10,177,542 B2 | 1/2019 | Joshi et al. | |
| 11,199,206 B2 | 12/2021 | Golden et al. | |
| 2002/0191673 A1 | 12/2002 | Lee | |
| 2009/0272576 A1 | 11/2009 | Medina | |
| 2011/0260874 A1 | 10/2011 | Gassmann | |
| 2017/0148300 A1 | 5/2017 | Stupak et al. | |
| 2019/0170804 A1 | 6/2019 | Thomas et al. | |
| 2021/0172804 A1 | 6/2021 | Patil et al. | |
| 2021/0381901 A1 | 12/2021 | Newlin et al. | |

FOREIGN PATENT DOCUMENTS

| | | |
|---|---|---|
| KR | 20090130992 A | 12/2000 |
| KR | 102031863 B1 | 10/2019 |
| WO | 2018213536 A1 | 11/2018 |

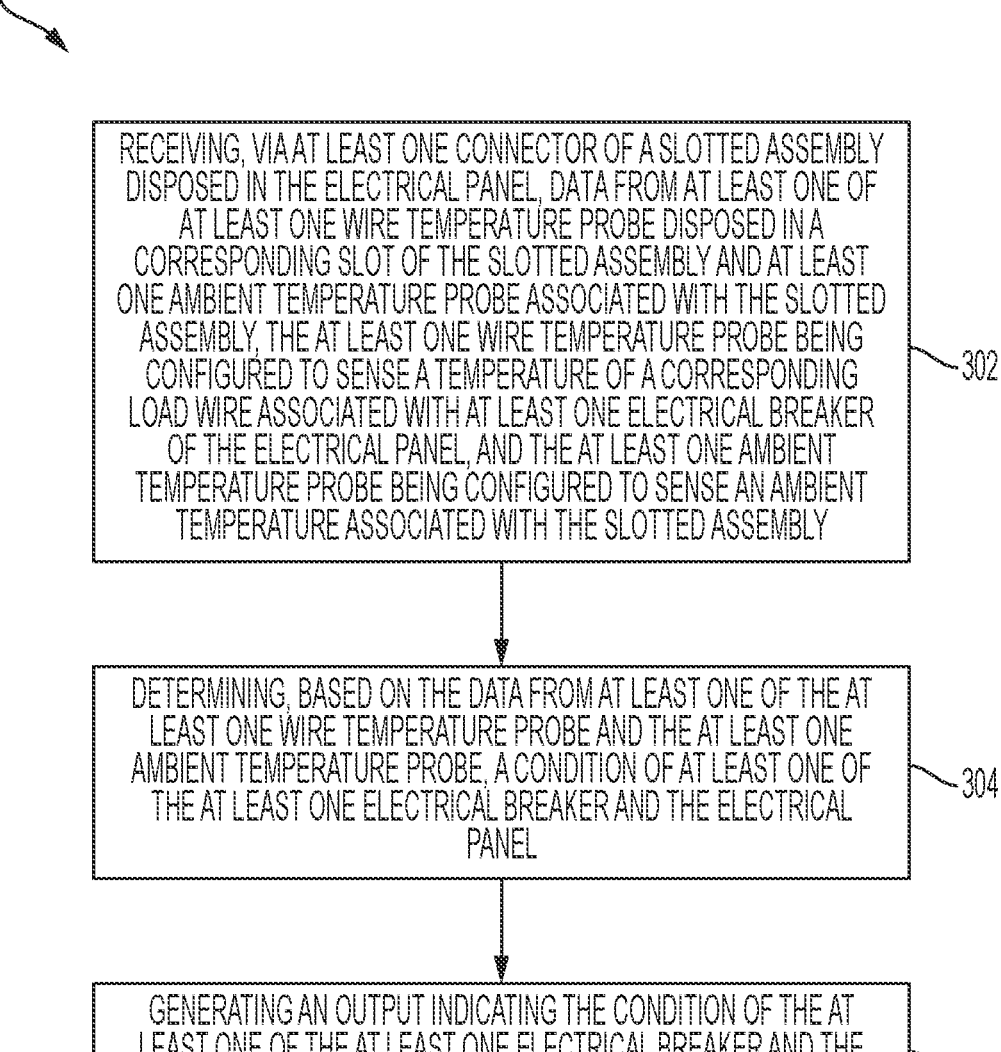

300

RECEIVING, VIA AT LEAST ONE CONNECTOR OF A SLOTTED ASSEMBLY DISPOSED IN THE ELECTRICAL PANEL, DATA FROM AT LEAST ONE OF AT LEAST ONE WIRE TEMPERATURE PROBE DISPOSED IN A CORRESPONDING SLOT OF THE SLOTTED ASSEMBLY AND AT LEAST ONE AMBIENT TEMPERATURE PROBE ASSOCIATED WITH THE SLOTTED ASSEMBLY, THE AT LEAST ONE WIRE TEMPERATURE PROBE BEING CONFIGURED TO SENSE A TEMPERATURE OF A CORRESPONDING LOAD WIRE ASSOCIATED WITH AT LEAST ONE ELECTRICAL BREAKER OF THE ELECTRICAL PANEL, AND THE AT LEAST ONE AMBIENT TEMPERATURE PROBE BEING CONFIGURED TO SENSE AN AMBIENT TEMPERATURE ASSOCIATED WITH THE SLOTTED ASSEMBLY — 302

DETERMINING, BASED ON THE DATA FROM AT LEAST ONE OF THE AT LEAST ONE WIRE TEMPERATURE PROBE AND THE AT LEAST ONE AMBIENT TEMPERATURE PROBE, A CONDITION OF AT LEAST ONE OF THE AT LEAST ONE ELECTRICAL BREAKER AND THE ELECTRICAL PANEL — 304

GENERATING AN OUTPUT INDICATING THE CONDITION OF THE AT LEAST ONE OF THE AT LEAST ONE ELECTRICAL BREAKER AND THE ELECTRICAL PANEL — 306

FIG. 2

SYSTEMS AND METHODS FOR MONITORING TEMPERATURE IN AN ELECTRICAL PANEL

CROSS-REFERENCE TO RELATED APPLICATIONS

This patent application claims the benefit and priority to U.S. Provisional Patent Application Ser. No. 63/389,526, filed Jul. 15, 2022 the entire disclosure of which is incorporated herein by reference.

FIELD

The following description relates to electrical panels and in particular to monitoring temperature of one or more wires, electrical breakers, and the like of an electrical panel.

BACKGROUND

In critical information technology (IT) infrastructure environments, two broad sources of IT disruption are human error and electromechanical breakdown. Both directly impact the integrity of electrical power distribution to IT equipment. Electrical power is commonly distributed to critical equipment loads via wire (e.g., or whips) connected from panel boards to rack-power distribution units (RPDUs) or directly to IT equipment. Panel boards include pole connections (e.g., typ. 42 and up to 84, or any other suitable pole connections) to distribute power via branch circuits having electrical breakers to protect equipment from electrical overload and other damaging conditions. Panel boards also include main input terminals and may or may not include a main input breaker. Panel boards with optional main breaker and/or monitoring capabilities are typically packaged in remote power panels/power distribution units (RPPs/PDUs) for installation and application convenience.

SUMMARY

This disclosure relates generally to temperature monitoring systems and methods.

An aspect of the disclosed embodiments includes a system for monitoring temperature in an electrical panel. The system includes a slotted assembly and a computing device. The slotted assembly may be disposed on a portion of an electrical panel proximate to at least one electrical breaker of the electrical panel. The slotted assembly may include: a body defining at least one slot disposed on a side of the body associated with at least one corresponding load wire associated with the at least one electrical breaker, the at least one slot being configured to engage the at least one corresponding load wire associated with the at least one electrical breaker; at least one wire temperature probe disposed in the at least one slot and configured to sense a temperature of the at least one corresponding load wire, the at least one wire temperature probe being connected to a communication cable; at least one ambient temperature probe configured to sense an ambient temperature associated with the slotted assembly; and at least one connector disposed on an end of the communication cable. The computing device may include a processor and a memory. The memory may include instructions that, when executed by the processor, cause the processor to: receive, via the at least one connector, data from at least one of the at least one wire temperature probe and the at least one ambient temperature probe; determine, based on the data from at least one of the at least one wire temperature probe and the at least one ambient temperature probe, a condition of at least one of the at least one electrical breaker and the electrical panel; and generate an output indicating the condition of the at least one of the at least one electrical breaker and the electrical panel.

Another aspect of the disclosed embodiments includes an apparatus for monitoring temperature in an electrical panel. The apparatus may include a slotted assembly disposed on a portion of an electrical panel proximate to at least one electrical breaker of the electrical panel. The slotted assembly may include: a body defining at least one slot disposed on a side of the body associated with at least one corresponding load wire associated with the at least one electrical breaker, the at least one slot being configured to engage the at least one corresponding load wire associated with the at least one electrical breaker; at least one wire temperature probe disposed in the at least one slot and configured to sense a temperature of the at least one corresponding load wire, the at least one wire temperature probe being connected to a communication cable; at least one ambient temperature probe configured to sense an ambient temperature associated with the slotted assembly; and at least one connector disposed on an end of the communication cable configured to connect the at least one wire temperature probe and the at least one ambient temperature probe to a computing device.

Another aspect of the disclosed embodiments includes a method for monitoring temperature in an electrical panel. The method may include: receiving, via at least one connector of a slotted assembly disposed in the electrical panel, data from at least one of at least one wire temperature probe disposed in a corresponding slot of the slotted assembly and at least one ambient temperature probe associated with the slotted assembly, the at least one wire temperature probe being configured to sense a temperature of a corresponding load wire associated with at least one electrical breaker of the electrical panel, and the at least one ambient temperature probe being configured to sense an ambient temperature associated with the slotted assembly; determining, based on the data from at least one of the at least one wire temperature probe and the at least one ambient temperature probe, a condition of at least one of the at least one electrical breaker and the electrical panel; and generating an output indicating the condition of the at least one of the at least one electrical breaker and the electrical panel.

Another aspect of the disclosed embodiments includes an apparatus for monitoring temperature. The apparatus includes a slotted assembly disposed on a one of a line side and a load side of at least one electrical breaker. The slotted assembly includes: a body defining at least one slot disposed on a side of the body associated with at least one corresponding wire associated with the at least one electrical breaker, the at least one slot being configured to engage the at least one corresponding wire associated with the at least one electrical breaker; at least one wire temperature probe disposed in the at least one slot and configured to sense a temperature of the at least one corresponding wire, the at least one wire temperature probe being connected to a communication cable; at least one ambient temperature probe configured to sense an ambient temperature associated with the slotted assembly; and at least one connector disposed on an end of the communication cable configured to connect the at least one wire temperature probe and the at least one ambient temperature probe to a computing device.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2 is a flow diagram generally illustrating a temperature monitoring method according to the principles of the present disclosure.

Figure 1A:
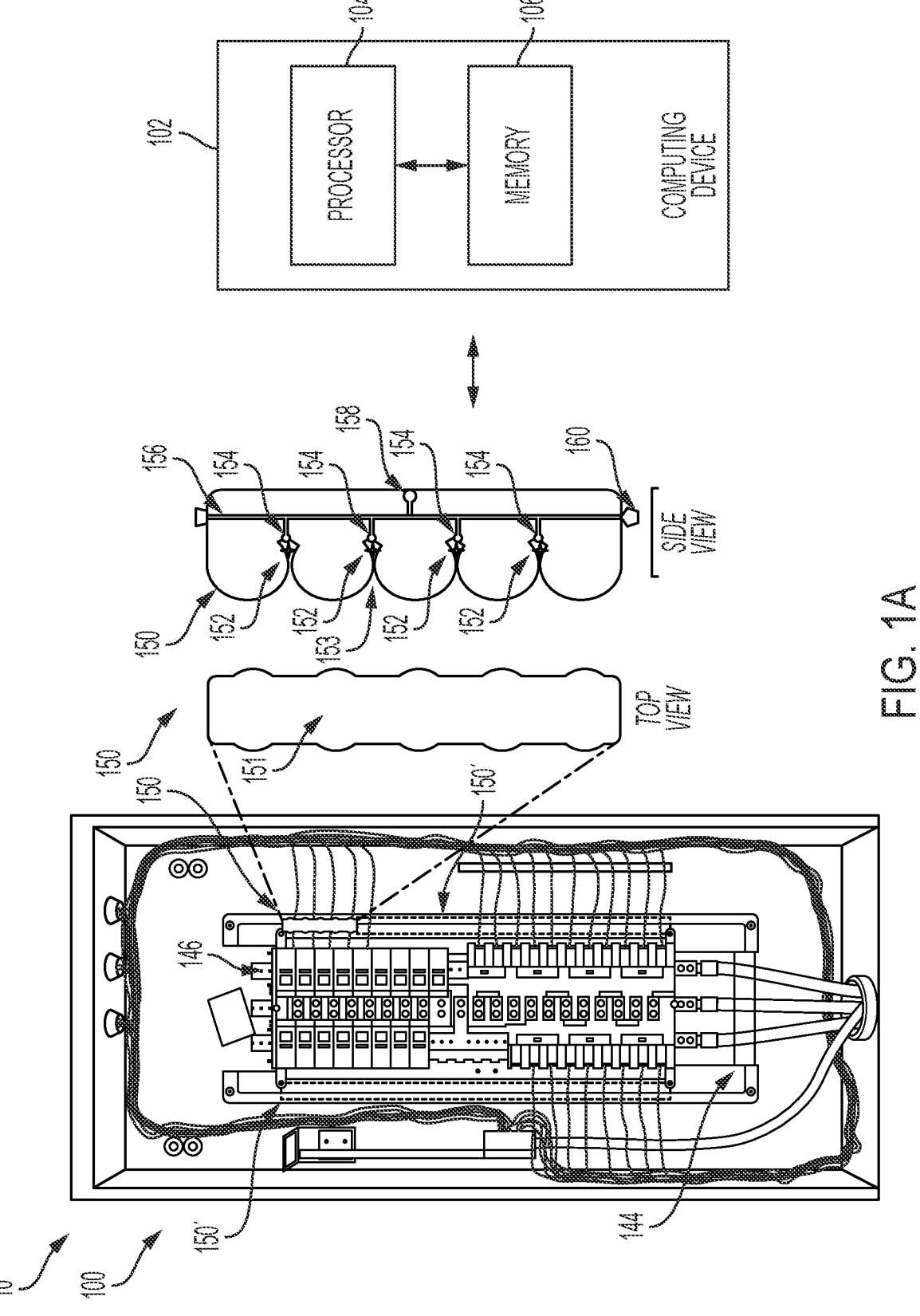
FIG. 1A generally illustrates a temperature monitoring system according to the principles of the present disclosure.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, in critical information technology (IT) infrastructure environments, two broad sources of IT disruption are human error and electromechanical breakdown. Both directly impact the integrity of electrical power distribution to IT equipment. Electrical power is commonly distributed to critical equipment loads via wire (e.g., or whips) connected from panel boards to rack-power distribution units (RPDUs) or directly to IT equipment. Panel boards include pole connections (e.g., typ. 42 and up to 84, or any other suitable pole connections) to distribute power via branch electrical breakers to protect equipment from electrical overload and other damaging conditions. Panel boards also include main input terminals and may or may not include a main input breaker. Panel boards with optional main breaker and/or monitoring capabilities are typically packaged in remote power panels/power distribution units (RPPs/PDUs) for installation and application convenience.

Typically, ambient temperatures near or inside panel boards can vary (e.g., from 70-130F (21-55C), or other suitable temperature range) depending on data center space location and/or conditioned air distribution per factors such as: hot/cold aisle position, floor to top of panel board/RPP/PDU stratification or hot spots (e.g., height typ. 84"/2.1 meter, and the like), limited conditioned airflow, and server operation cycles.

In addition, as data center operators and businesses embrace environmentally sustainable strategies, such entities may seek to maximize electrical utilization and minimize energy use and/or loss. To support these strategies, and as data center design continues to increase general ambient operating temperatures and pursue ways to extend electrical infrastructure usage and longevity, monitoring of faults (e.g., or various conditions) becomes increasingly important. In addition, over time, electrical breakers can mechanically break down due to cycling and/or usage and/or operating at elevated ambient temperatures. Break down would typically occur over long periods (e.g., years) and associated heat loss increases would rise slowly (e.g., such that detection requires on-going intimate temperature monitoring).

Heat and/or temperature fields of electrical breakers and/or connections may be difficult to discretely measure due to tight pole and/or electrical breaker spacing on panel boards. In addition, data center panel board/RPP/PDU location and conditioned air distribution can impact discrete measurement or comparison of electrical breaker heat and/or temperature fields. Branch connected loads may cycle over the course of an hour or day or more. As a result, faulty connection or mechanically failing electrical breaker heat generation may vary significantly over time. Thus, the load state or power consumption may represent a part of heat and/or temperature profile for an electrical breaker or breaker terminal.

In such panel boards, electrical breaker loads are typically manually wired and secured to electrical breaker terminals by an electrician. A terminal connection may initially be inadequate if improperly seated or torqued, may degrade over time, and/or be compromised. Over time, vibration from external equipment or vibration transmitted through the wiring may impact connections. Additionally, a connection may become loose by inadvertent contact by a technician when adding or changing branch electrical breakers. Loose connections may result in electrical overload, excessive heat generation, and/or arcing that may present a fire hazard. As a result, connected critical loads are compromised or dropped.

Typically, checking wire connections generally requires a trained technician and is done at installation or during preventive maintenance checks. Checking typically includes physical review, thermal scanning, and/or related temperature review. Continuous and on-going means to check connection integrity may have limited retrofit and/or maintenance provisions and/or may require special discrete devices.

Elevated ambient and/or internal panel board temperatures may impact electrical breaker performance or integrity (e.g., premature tripping, reduced life, and/or the like). In addition, thermal influences of data center location and/or air distribution may bias interpretation of local panel board and/or electrical breaker temperature readings. Further, electrical integrity checking must be safe, consistent, and systematic. Manual methods and/or intervention may make these requirements difficult to fulfill.

Current methods to check branch and/or main breaker wire connections and general integrity include direct methods used at initial installation and/or during periodic maintenance and/or embedded methods utilizing integrated sensors in individual electrical breakers (e.g., in the panel board structure, in energy metering systems, and/or the like). Typically, direct methods may require on-site, trained personnel. Since connections may loosen and/or components mechanically breakdown over time, relying on checking only at initial installation or during periodic maintenance may miss the moment connections become compromised and/or the electrical breaker becomes compromised. Embedded methods either require discrete specialized electrical breakers with per device communications or, as integrated in energy systems, do not easily support panel board lifecycle needs, such as retrofit and/or service repair.

A common method to check wire connection integrity is to manually pull on the wires to check the strength of the terminal seating, which may be referred to as pull strength testing. Non-instrumented pull strength testing is ambiguous and may undermine connection strength. In addition, safe practice requires the panel or electrical breaker load to be de-energized before conducting a pull test.

Infrared (IR) scanning is commonly used to check panel board main connections or body and requires an IR port with special viewing materials, and an IR scanner. Depending on the nature of the scanning port design, personal protection equipment (PPE) may be required. However, IR scanning is impractical for branch electrical breakers due to inherent access limitations. Branch electrical breaker IR scanning is ineffective due to typical branch electrical breaker design that includes covers or casings that block the line of sight to the connection. If line of sight is possible, IR scanning is cost prohibitive due to the size and/or the amount of IR viewing port material that would be required for the panel board length and all pole and/or electrical breaker positions.

Another method to oversee electrical breaker connection or general integrity directly embeds temperature sensors into electrical breakers or in an energy system to monitor electrical breaker connection or general heat generation. These provide continuous electrical breaker or connection temperature monitoring and output current association. Separate temperature sensors can also be disposed on or in the panel board structure. An electrical breaker implementation requires each electrical breaker to be daisy chained to an external controller, possibly resulting in greater difficulty correlating the power and thermal information. An electrical breaker approach limits users to specialized devices that may incur cost and are typically not readily available.

An energy system implementation requires the expense of electrical breaker current metering, typically requires disrupting loads during retrofit or maintenance (e.g., electrical breaker load side wire removal), and/or does not lend to non-invasive servicing of faulty temperature sensors. Temperature sensors embedded in panel board structure do not easily lend to post-installation retrofit and require custom panel construction.

Due to increased resistance, a faulty electrical wire connection will generate heat. The temperature near the connection will be higher than the general ambient and will rise over time if the connection degrades. The heat generated by a single faulty connection may typically not be sufficient to raise general panel or installed space temperature. However, the temperature rise near a single connection is discernible. Further, branch connected loads may cycle over the course of an hour or day or more. As a result, faulty connection heat generation may vary significantly over time. Thus, the load state or power consumption defines a part of heat and/or temperature profile at an electrical breaker terminal. Electrical breaker connection heat and/or temperature may be difficult to discretely measure due to tight pole and/or electrical breaker spacing on panel boards.

Accordingly, systems and methods, such as those described herein, configured to provide temperature monitoring of a panel board (e.g., which may be referred to herein as an electrical panel), while addressing these shortcomings of typical solutions, may be desirable. In some embodiments, the systems and methods described herein may be configured to provide oversight and/or assure the on-going integrity of branch load and/or main input/breaker wiring connection(s) on electrical distribution panel boards external to the connected device.

The systems and methods described herein may be configured to provide a mono-block current transformer (CT) bar or similar fixed and/or unified multi-CT construction with integrated temperature sensors, which may be collectively referred to herein as a slotted assembly. The slotted assembly may be mounted in a panel board in close proximity to branch load and/or main connections. Individual temperature sensor probes may be located at each CT and/or connection position to provide specific connection temperature metering. The systems and methods described herein may be configured to directly relate individual load and/or main connection power consumption and temperature behavior to provide continuous connection integrity oversight and to notify users or system controls for electrical breaker or load actions. The systems and methods described herein may be configured to provide one or more embedded sensors and relational electronics.

In some embodiments, a mono-block bar or similar integrated CT structure positions individual CTs (e.g., a slotted assembly) may be disposed at each branch electrical breaker pole position along the length of the panel board electrical breaker mounting space and/or at the main. At least one wire or diode temperature sensor is integrated into the slotted assembly with sensor probes positioned at each CT for close proximity to an electrical breaker or main connection. Temperature sensors may be encased in potting material of the slotted assembly or within the fixed structure and positioned to physically protect the probe and mitigate potential connection-probe arcing. In some embodiments, one or more temperature sensors may be positioned within the CT opening. Additionally, or alternatively, one or more temperature sensors may be positioned near and/or on a face of the CT opening facing the electrical breaker connection CT/sensors pairs relate power consumption versus temperature levels to create individualized load-to-temperature (LT) relationships and an overall panel board LT map. In some embodiments, relational electronics may be embedded and bussed in the mono-block (e.g., the slotted assembly) to provide physical protection and packaged deployment. Additionally, or alternatively, relational data may be bussed out of the mono-block for external processing.

In some embodiments, the one or more temperature sensors may be daisy-chained or connected in parallel back to a single connection for a monitoring interface. The sensor string per mono-block may be constructed as a single wire-harness or other suitable construction. At least one ambient temperature sensor may be located external to the panel board and may be used to compare connection temperature rise against varying ambient temperature conditions.

In some embodiments, the systems and methods described herein may be configured to use national electrical standards and codes, wire rating limits, along with predefined LT thresholds to set warning and alarm levels for electrical breaker connection integrity and the overall panel board safety. The systems and methods described herein may be configured to correlate the data from CT/sensors pairs of adjacent poles of electrical breaker(s) to determine if a single electrical breaker connection is influencing LT behavior of other connections.

In some embodiments, the systems and methods described herein may be configured to use predictive analytics to provide deeper insight into individual connection to electrical system integrity. The systems and methods described herein may be configured to use data capture of LT behavior, trending, and maps (e.g., connected loads, panel board layout, and/or the like) of discrete systems and/or product populations, and/or electrical systems to build predictive models to define operational norms, failure windows, maintenance or replacement requirements, and/or the like. The systems and methods described herein may be configured to generate models for individual connections, electrical breakers and/or loads, panel boards, main connections, electrically connected systems of multiple devices, any other suitable application, or a combination thereof.

The systems and methods described herein may be configured to use LT relationships and/or mapping to manage loads via on/off switching at the electrical breaker or RPDU. The systems and methods described herein may be configured to generate one or more visual indicators for each CT/sensor pair to indicate thermal condition (e.g., tri-color light emitting diodes (LED), such as a green LED indicating 'Active', an orange LED indicating 'Alarm', a red LED indicating 'Fault', green-flashing LED to indicate connected RPDU relationship, and/or any other suitable LED or indicator). The systems and methods described herein may be configured to allow for continuous, non-intrusive, and remote oversight of electrical panel board connection integrity. The systems and methods described herein may be configured to assure unambiguous CT-to-temperature to pole-to-connection relationship, where CTs and sensors are fabricated together and specifically positioned against industry standard, fixed pole spacing.

The systems and methods described herein may be configured to provide uniform and consistent temperature measurement positioning, which may be superior to manually implemented positioning. The systems and methods described herein may be configured to enable pre-installed and/or ready capabilities for when a user adds a new electrical breaker and/or load connections. The systems and methods described herein may be configured to support relatively easy coordination of energy and thermal metering with a single internal or external controller. The systems and methods described herein may be configured to allow for safe temperature measurement with close sensor probe proximity to electrical connections. The systems and methods described herein may be configured to facilitate agnostic support of standardized panel boards, circuit breakers (e.g., which may be referred to herein as electrical breakers), and/or connections.

In some embodiments, the systems and methods described herein may be configured to provide improved relational metrics. For example, the systems and methods described herein may be configured to provide concurrent power and temperature measurements that dynamically relate connection temperature against electrical load and/or state. The systems and methods described herein may be configured to allow for comparison of LT relationships on a single or multiple panels in a data center(s). The systems and methods described herein may be configured to provide on-going integrity oversight (e.g., rather than ad hoc checking during electrical breaker addition or preventive maintenance). The systems and methods described herein may be configured to allow for the potential to manage loads via direct intervention or switching based on actionable information. The systems and methods described herein may be configured to provide a safe technique for checking connections, without the risk of manual intervention or probing.

In some embodiments, the systems and methods described herein may be configured to apply to sub-feed distribution, 3-phase uninterruptable power supply (UPS) system input/output and/or other critical device connections that use dimensionally standardized connection positions via two to "X"-pole mono-blocks. The systems and methods described herein may be configured to provide a mono-block without CT to monitor temperature levels and rise. The systems and methods described herein may be configured to leverage the mono-block structure with power cable pass-through holes to position temperature sensors for measurement. The systems and methods described herein may be configured to integrate temperature sensor probes into a panel board cover used to limit access to branch electrical breakers. The systems and methods described herein may be configured to use at least one magnetic field sensor (e.g., and/or at least one thermistor or semiconductor type sensor) for sensing temperature of the electrical breaker, panel board, environment associated with the panel board, and/or the like.

In some embodiments, the systems and methods described herein may be configured to provide oversight and ensures the on-going integrity of branch load and/or main input and/or breaker wiring connection(s) and general electrical breaker integrity on electrical distribution panel boards connected to critical loads. The systems and methods described herein may be configured to provide a modular sensor isolating slotted assembly with integrated temperature probes. The slotted assembly may be mounted in a panel board or main space directly on the electrical breaker load side wiring and in immediate proximity to branch load and/or main connections. Individual temperature sensor probes may be located at each pole and/or connection position to provide specific connection temperature metering. Additionally, or alternatively, ambient temperature probes may be located on an external face along the length of the slotted assembly. The slotted assembly may be constructed of thermal insulating material to isolate pole-to-pole and pole-to-ambient metering. The slotted assembly may also include embedded sensors and/or relational electronics.

In some embodiments, the systems and methods described herein may be configured to provide continuous connection and/or electrical breaker integrity oversight and notifies users or system controls for electrical breaker and/or load actions based on directly relating individual branch and/or main connection temperature behavior to sectional ambient temperature, and/or to near field pole temperature, and/or to power consumption.

The systems and methods described herein may be configured to provide a sensor slotted assembly or structure that isolates and positions temperature sensors along the length or in designated sections of panel board electrical breaker, panel board input, panel board electrical breaker output, and/or main output wiring space. Sensors may be located at each breaker pole position and sectionally to provide localized ambient readings. The slotted assembly or structure may comprise lightweight foam, gel, or other suitable flexible lightweight thermal insulating material to isolate pole-to-pole and/or ambient temperature probe sensing.

In some embodiments, the slotted assembly may extend the length of the panel board/RPP and may be constructed of sectional modules of various lengths per electrical breaker pole (e.g., 1-4 pole at specified ¾" or 1" pole-to-pole and/or other suitable configuration) or per banks (e.g., 7, 14, 21, 42 pole or other suitable pole). The systems and methods described herein may be configured to use module connectors to position the sectional ambient sensors. The systems and methods described herein may be configured to integrate temperature sensors (e.g., diode, thermocouples, thermistors, silicon-based 1-wire, and/or the like) into the gird or structure.

The systems and methods described herein may be configured to encase temperature sensors in the insulating material or within the structure and positioned to physically protect the probe and mitigate potential connection-probe arcing. In some embodiments, pole temperature sensors may be positioned near and/or on the interior face of the slotted assembly or structure facing the electrical breaker connection. In some embodiments, pole temperature sensors may be positioned in the inter-diameter of the gird or structure in the output wire insertion slots.

In some embodiments, the temperature sensors may be daisy-chained or connected in parallel back to a single connection for a monitoring interface. The sensor string per sensor slotted assembly may be constructed as a single wire-harness. In some embodiments, the gird and/or sensor electronics are powered from an external source. Additionally, or alternatively, a split-core CT(s) may be embedded in the gird or on the main output to scavenge power for the gird and/or sensor electronics. CT(s) may be positioned at the output wiring slots(s). Additionally, or alternatively, the systems and methods described herein may be configured to use additional ambient temperature sensor(s) located external to the panel board to compare connection and/or sectional temperature rise against external ambient conditions.

In some embodiments, the systems and methods described herein may be configured to provide one or more visual indicators per electrical breaker and/or pole position to indicate thermal state, as described. In some embodiments, one or more eyelets formed in the slotted assembly or structure or on the connection wire-harness may be provided to allow for mounting or wire-tie support attachment to the panel board, distribution wire bundle, and/or other convenient fixed structure.

In some embodiments, each electrical breaker connection and/or sectional temperature sensor may capture specific position conditions and/or the systems and methods described herein may be configured to interrelate the conditions to create an overall panel board temperature sensor (TS) map. In some embodiments, the systems and methods described herein may be configured to embed and/or bus relational electronics the slotted assembly to provide physical protection and packaged deployment. In some embodiments, the systems and methods described herein may be configured to bus out relational data from the gird for external processing.

In some embodiments, the systems and methods described herein may be configured to distinguish temperature rise impact of data center space location and/or conditioned air distribution versus local panel board/RPP/PDU temperatures. The systems and methods described herein may be configured to deliver a more accurate 3-dimensional thermal profile mapping. The systems and methods described herein may be configured to enable pre-installed and/or ready or retrofit capabilities. The systems and methods described herein may be configured to support existing system breaker and/or load connection additions. The systems and methods described herein may be configured to use an open and/or slotted construction that supports unencumbered and easily mounted retrofit to existing and/or wired systems and/or to energized distribution.

The systems and methods described herein may be configured to support easy extension and/or field repair with modular design and independent structure. The systems and methods described herein may be configured to allow for safe temperature measurement with close sensor probe proximity to electrical connections. The systems and methods described herein may be configured to allow for comparison of TS and/or LT relationships on a single or multiple panels in a data center(s). The systems and methods described herein may be configured to allow for the potential to manage loads via direct intervention or switching based on actionable information. The systems and methods described herein may be configured to provide improved relational metrics and/or management.

In some embodiments, the systems and methods described herein may be configured to be applied to sub-feed distribution, 3-phase UPS system input/output, busway distribution feed and/or distribution, and/or other critical device connections that use dimensionally standardized connection positions via two to "X"-pole girds. The systems and methods described herein may be configured to integrate temperature sensor probes into a panel board cover used to limit access to branch electrical breakers. The systems and methods described herein may be configured to use one or more of magnetic field sensors, humidity sensors, visual IR sensors, other suitable sensors, or a combination thereof for monitoring temperature associated with slotted assembly, electrical breaker, panel board, and/or environment associated with the panel board.

In some embodiments, the systems and methods described herein may be configured to provide a slotted assembly and a computing device. The slotted assembly may be disposed on a portion of an electrical panel proximate to at least one electrical breaker of the electrical panel. The slotted assembly may include: a body defining at least one slot disposed on a side of the body associated with at least one corresponding load wire associated with the at least one electrical breaker, the at least one slot being configured to engage the at least one corresponding load wire associated with the at least one electrical breaker; at least one wire temperature probe disposed in the at least one slot and configured to sense a temperature of the at least one corresponding load wire, the at least one wire temperature probe being connected to a communication cable; at least one ambient temperature probe configured to sense an ambient temperature associated with the slotted assembly; and at least one connector disposed on an end of the communication cable.

In some embodiments, the computing device may include a processor and a memory. The memory may include instructions that, when executed by the processor, cause the processor to: receive, via the at least one connector, data from at least one of the at least one wire temperature probe and the at least one ambient temperature probe; determine, based on the data from at least one of the at least one wire temperature probe and the at least one ambient temperature probe, a condition of at least one of the at least one electrical breaker and the electrical panel; and generate an output indicating the condition of the at least one of the at least one electrical breaker and the electrical panel.

In some embodiments, the body further includes a plurality of slots disposed on the side of the body associated with corresponding load wires, each of the plurality of slots being configured to engage with a respective one of the corresponding load wires. In some embodiments, the body may also include a plurality of wire temperature probes, each wire temperature probe being disposed in a corresponding slot of the body. In some embodiments, the plurality of wire temperature probes are connected to one another and at least the communication cable in a daisy-chain configuration. In some embodiments, the plurality of wire temperature probes are connected to one another and at least the communication cable in a parallel configuration.

Figure 1B:
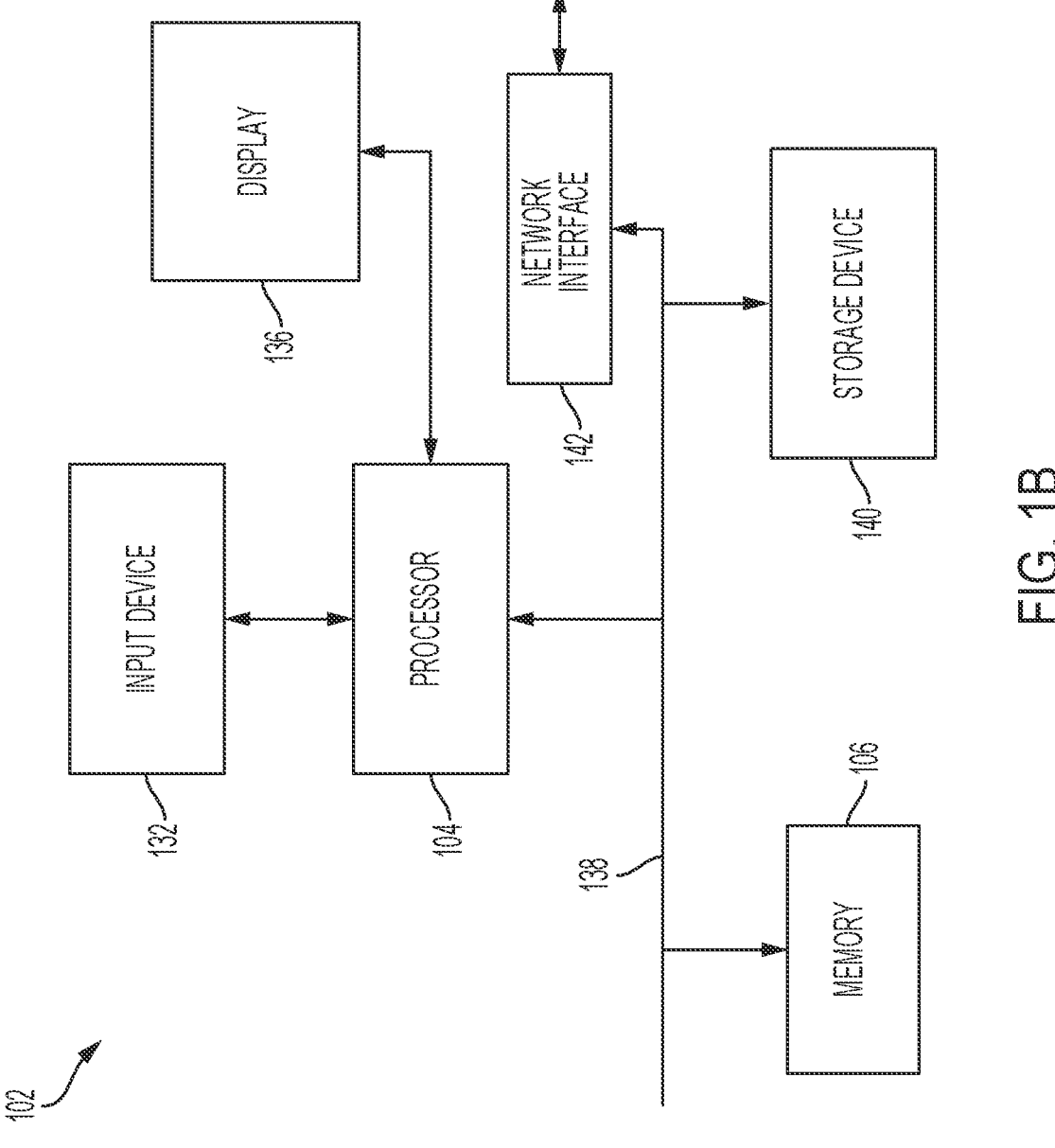
FIG. 1B generally illustrates a computing device according to the principles of the present disclosure.

With reference to FIGS. 1A and 1B a temperature monitoring system 10, according to the principles of the present disclosure, is generally illustrated. The system 10 may include an electrical panel 100 and a computing device 102. The computing device 102 may include a processor 104 and a memory 106. The processor 104 may include any suitable processor, such as those described herein. Additionally, or alternatively, the computing device 102 may include any suitable number of processors, in addition to or other than the processor 104. The memory 106 may comprise a single disk or a plurality of disks (e.g., hard drives), and may include a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, perform the functions associated with the systems and methods described herein.

The computing device 102 may include a user input device 132, as is generally illustrated in FIG. 1B, that is configured to receive input from a user of the computing device 102 and to communicate signals representing the input received from the user to the processor 104. For example, the user input device 132 may include a button, keypad, dial, touch screen, audio input interface, visual/image capture input interface, input in the form of sensor data, etc.

The computing device 102 may include a display 136 that may be controlled by the processor 104 to display information to the user. A data bus 138 may be configured to facilitate data transfer between, at least, a storage device 140 and the processor 104. The computing device 102 may also include a network interface 142 configured to couple or connect the computing device 102 to various other computing devices or network devices via a network connection, such as a wired or wireless connection, or other suitable connection. In some embodiments, the network interface 142 includes a wireless transceiver.

The storage device 140 may comprise a single disk or a plurality of disks (e.g., hard drives), one or more solid-state drives, one or more hybrid hard drives, and the like. The storage device 140 may include a storage management module that manages one or more partitions within the storage device 140. In some embodiments, storage device 140 may include flash memory, semiconductor (solid state) memory, or the like.

The computing device 102 may include any suitable computing device or multiple devices including one or more of a mobile computing device (e.g., a smart phone, tablet, or other suitable mobile computing device), a laptop computing device, a desktop computing device, a cloud computing device or system, a remotely located server or servers, a remotely or proximately located mobile computing device or application server that provides information to a mobile computing device, other suitable remote computing devices, or a combination thereof.

In some embodiments, the computing device 102 may be configured to monitor a temperature of one or more electrical breakers 146 of the panel 100 and/or ambient temperature of the panel 100 and/or a portion of an environment associated with the panel 100. The panel 100 may include a power input 144. The power input 144 may include a plurality of wires and/or connections configured to provide electrical power to the panel 100 from a suitable power source. The power provided by the power input 144 may be distributed through the panel 100 via various wires, though each respective electrical breaker 146. Electrical power may then leave the panel 100 via respective output wires or connections. The electrical power may be transmitted, via the output wires or connections, to various and respective infrastructure components (e.g. such as information technology infrastructure components, such as computing devices, switches, routers, displays, and the like, any other suitable infrastructure components, or a combination thereof). It should be understood that while limited examples are provided, the panel 100 may be associated with any suitable electrical power distribution application, including, in combination with, or instead of information technology infrastructure.

In some embodiments, the panel 100 includes a temperature monitoring slotted assembly 150. The slotted assembly 150 may be disposed within the panel 100 proximate one or more electrical breakers 146. The slotted assembly 150 may be configured to secure a convergence of temperature sensors and power cables, including connections to sensors to establish various communication features with the sensors. In some embodiments, the slotted assembly 150 may include one or more insulating materials disposed on one or more portions of the slotted assembly 150 to allow for temperature measurements (e.g., temperature measurements associated with respective slots of the slotted assembly 150 and/or ambient temperature measurements) to be distinguished. In some embodiments, the slotted assembly 150 may be implemented on an input of the panel 100 (e.g., for temperature monitoring of various inputs of the panel 100), on an input of the main power supplied to the panel 100 (e.g., for temperature monitoring of the main power supplied to the panel 100), on a breaker output (e.g., for temperature monitoring of the output of the breaker), on one or more breaker outputs of a tap-off box (e.g., configure to draw power away from an associated busbar), any other suitable location, or any suitable combination thereof.

The slotted assembly 150 may include a body 151. The body 151 may comprise any suitable material including, but not limited to, a flexible, lightweight, thermal insulating material, such as foam, gel, or other suitable thermal insulating material. The body 151 may be configured to isolate pole-to-pole temperature and/or pole-to-ambient temperature. The body 151 may include any suitable geometry, such as the geometry of the body 151 generally illustrated and/or any other suitable geometry. The geometry of the body 151 may be defined and/or adjusted based on an application associated with the slotted assembly 150. For example, the geometry of the body 151 may include a star type geometry, a clover type geometry, and/or the like.

The body 151 may include a plurality of slots 153 configured to receive and/or engage corresponding panel board distribution or load wires 152. The body 151 may be configured to include fewer or additional slots 153 than those illustrated herein and/or may include one or more slots having features that are similar and/or different from features of slots 153. Additionally, or alternatively, the slots 153 may be configured to receive and/or engage corresponding wire temperature sensors or probes 154. The probes 154 may be daisy chained, connected in parallel, or connected in any suitable manner using one or more sensor or probe communication cables 156. As used herein, a cable may comprise one or more wires. One or more ambient temperature sensors or probes 158 may be connected to the probe communication cable 156 and may be disposed in or on the body 151. A connector 160 (e.g., including a low voltage plug or receptacle) may be disposed on one or each respective end of each respective probe communication cable 156. The connector 160 may be configured to connect the slotted assembly 150, and correspondingly, the probes 154 and/or the probe (e.g., or probes) communication cables 156 to the computing device 102 and/or to any suitable monitoring device configured to receive probe values from each or the probes 154 and/or the probe (e.g. or probes) communication cables 156.

In some embodiments, the slot assembly 150 may be configured to fit over a one or more line-side wires of one or more respective electrical breakers, such as electrical breakers 146 or other suitable electrical breaker (e.g., including, but not limited to a 3-pole electrical breaker) of a tap-off box, as described. The slot assembly 150 may be disposed on either or both of respective line side wires or load side wires feeding into the one or more respective electrical breakers.

Additionally, or alternatively, the slot assembly 150 (e.g., or another slot assembly 150) may be disposed proximate receptacle terminations. In some embodiments, the slot assembly 150 may be configured to be disposed to provide sufficient clearance spacing between the slot assembly 150 and other components proximate the slot assembly 150. In some embodiments, the slot assembly 150 may be configured to engage linear wire spacing or arrangement of the one or more respective electrical breakers, configured to engage curvilinear wiring spacing or arrangement of the proximate receptacle, or configured in any suitable manner.

In some embodiments, the computing device 102 may receive, via the connector 160, data from one or more of the probes 154 and/or the probe communication cable 156. The computing device 102 may determine, based on the data, a condition (e.g., which may include at least one of an active condition, a faulty condition, an overheating condition, a disconnected condition, other suitable conditions, or a combination thereof) of at least one of the electrical breakers 146, one of the electrical wires associated with the electrical breakers 146, any other suitable component of the panel 100, and/or the panel 100. The computing device 102 may generate an output (e.g., such as a visual indicator or other suitable output) indicating the condition. The computing device 102 may generate the output for display. The computing device 102 may provide, at the display 136 or other suitable display or combination of displays, either proximately or remotely located from the computing device 102, the output and/or other suitable information associated with the condition, the panel 100, and/or any other suitable components of the panel 100.

In some embodiments, the panel 100 may include a temperature monitoring slotted assembly 150' (e.g., in addition to or instead of the slotted assembly 150). The slotted assembly 150' may include features similar to those of the slotted assembly 150. The slotted assembly 150' may extend along the panel 100 such that the slotted assembly 150' covers all electrical breakers 146 on one side of the panel 100. Additionally, or alternatively, the panel 100 may include another slotted assembly 150' that extends along another side of the panel 100 covering all electrical breakers 146 on the other side of the panel 100. It should be understood that the panel 100 may include any suitable number of slotted assemblies 150 and/or slotted assemblies 150' covering any suitable number of electrical breakers 146.

In some embodiments, the system 10 and/or the computing device 102 may perform the methods described herein. However, the methods described herein as performed by the system 10 and/or the computing device 102 are not meant to be limiting, and any type of software executed on a controller can perform the methods described herein without departing from the scope of this disclosure. For example, a controller, such as a processor executing software within a computing device, can perform the methods described herein.

FIG. 2 is a flow diagram generally illustrating a temperature monitoring method 300 according to the principles of the present disclosure. At 302, the method 300 receives, via at least one connector of a slotted assembly disposed in the electrical panel, data from at least one of at least one wire temperature probe disposed in a corresponding slot of the slotted assembly and at least one ambient temperature probe associated with the slotted assembly, the at least one wire temperature probe being configured to sense a temperature of a corresponding load wire associated with at least one electrical breaker of the electrical panel, and the at least one ambient temperature probe being configured to sense an ambient temperature associated with the slotted assembly. For example, the computing device 102 may receive the data from the connector 160.

At 304, the method 300 may determine, based on the data from at least one of the at least one wire temperature probe and the at least one ambient temperature probe, a condition of at least one of the at least one electrical breaker and the electrical panel. For example, the computing device 102 may determine, based on the data, the at least one condition of one or more of the electrical breakers 146 and/or the panel 100.

At 306, the method 300 may generate an output indicating the condition of the at least one of the at least one electrical breaker and the electrical panel. For example, the computing device 102 may generate the output indicating at least the condition.

In some embodiments, a system for monitoring temperature in an electrical panel includes a slotted assembly and a computing device. The slotted assembly may be disposed on a portion of an electrical panel proximate to at least one electrical breaker of the electrical panel. The slotted assembly may include: a body defining at least one slot disposed on a side of the body associated with at least one corresponding load wire associated with the at least one electrical breaker, the at least one slot being configured to engage the at least one corresponding load wire associated with the at least one electrical breaker; at least one wire temperature probe disposed in the at least one slot and configured to sense a temperature of the at least one corresponding load wire, the at least one wire temperature probe being connected to a communication cable; at least one ambient temperature probe configured to sense an ambient temperature associated with the slotted assembly; and at least one connector disposed on an end of the communication cable. The computing device may include a processor and a memory. The memory may include instructions that, when executed by the processor, cause the processor to: receive, via the at least one connector, data from at least one of the at least one wire temperature probe and the at least one ambient temperature probe; determine, based on the data from at least one of the at least one wire temperature probe and the at least one ambient temperature probe, a condition of at least one of the at least one electrical breaker and the electrical panel; and generate an output indicating the condition of the at least one of the at least one electrical breaker and the electrical panel.

In some embodiments, the body further includes a plurality of slots disposed on the side of the body associated with corresponding load wires, each of the plurality of slots being configured to engage with a respective one of the corresponding load wires. In some embodiments, the body may also include a plurality of wire temperature probes, each wire temperature probe being disposed in a corresponding slot of the body. In some embodiments, the plurality of wire temperature probes are connected to one another and at least the communication cable in a daisy-chain configuration. In some embodiments, the plurality of wire temperature probes are connected to one another and at least the communication cable in a parallel configuration.

In some embodiments, an apparatus for monitoring temperature in an electrical panel may include a slotted assembly disposed on a portion of an electrical panel proximate to at least one electrical breaker of the electrical panel. The slotted assembly may include: a body defining at least one slot disposed on a side of the body associated with at least one corresponding load wire associated with the at least one electrical breaker, the at least one slot being configured to engage the at least one corresponding load wire associated with the at least one electrical breaker; at least one wire temperature probe disposed in the at least one slot and configured to sense a temperature of the at least one corresponding load wire, the at least one wire temperature probe being connected to a communication cable; at least one ambient temperature probe configured to sense an ambient temperature associated with the slotted assembly; and at least one connector disposed on an end of the communication cable configured to connect the at least one wire temperature probe and the at least one ambient temperature probe to a computing device.

In some embodiments, the body may also include a plurality of slots disposed on the side of the body associated with corresponding load wires, each of the plurality of slots being configured to engage with a respective one of the corresponding load wires. In some embodiments, the body may also include a plurality of wire temperature probes, each wire temperature probe being disposed in a corresponding slot of the body. In some embodiments, the plurality of wire temperature probes are connected to one another and at least the communication cable in a daisy-chain configuration. In some embodiments, the plurality of wire temperature probes are connected to one another and at least the communication cable in a parallel configuration. In some embodiments, the computing device is configured to receive, via the at least one connector, data from at least one of the at least one wire temperature probe and the at least one ambient temperature probe. In some embodiments, the computing device is further configured to determine, based on the data from at least one of the at least one wire temperature probe and the at least one ambient temperature probe, a condition of at least one of the at least one electrical breaker and the electrical panel. In some embodiments, the computing device is further configured to generate an output indicating the condition of the at least one of the at least one electrical breaker and the electrical panel.

In some embodiments, a method for monitoring temperature in an electrical panel may include: receiving, via at least one connector of a slotted assembly disposed in the electrical panel, data from at least one of at least one wire temperature probe disposed in a corresponding slot of the slotted assembly and at least one ambient temperature probe associated with the slotted assembly, the at least one wire temperature probe being configured to sense a temperature of a corresponding load wire associated with at least one electrical breaker of the electrical panel, and the at least one ambient temperature probe being configured to sense an ambient temperature associated with the slotted assembly; determining, based on the data from at least one of the at least one wire temperature probe and the at least one ambient temperature probe, a condition of at least one of the at least one electrical breaker and the electrical panel; and generating an output indicating the condition of the at least one of the at least one electrical breaker and the electrical panel.

In some embodiments, the slotted assembly includes a body defining at least the corresponding slot, wherein the corresponding slot is disposed on a side of the body associated with at least one corresponding load wire associated with the at least one electrical breaker, and wherein the corresponding slot is configured to engage the at least one corresponding load wire associated with the at least one electrical breaker. In some embodiments, the body further includes a plurality of slots disposed on the side of the body associated with corresponding load wires, each of the plurality of slots being configured to engage with a respective one of the corresponding load wires. In some embodiments, the body further includes a plurality of wire temperature probes, each wire temperature probe being disposed in a corresponding slot of the body. In some embodiments, the plurality of wire temperature probes are connected to one another and at least a communication cable in a daisy-chain configuration. In some embodiments, the plurality of wire temperature probes are connected to one another and at least the communication cable in a parallel configuration. In some embodiments, the condition includes at least one of an active condition of the at least one of the at least one electrical breaker and the electrical panel, a faulty condition of the at least one of the at least one electrical breaker and the electrical panel, an overheating condition of the at least one of the at least one electrical breaker and the electrical panel, and a disconnected condition of the at least one of the at least one electrical breaker and the electrical panel.

In some embodiments, an apparatus for monitoring temperature includes a slotted assembly disposed on a one of a line side and a load side of at least one electrical breaker. The slotted assembly includes: a body defining at least one slot disposed on a side of the body associated with at least one corresponding wire associated with the at least one electrical breaker, the at least one slot being configured to engage the at least one corresponding wire associated with the at least one electrical breaker; at least one wire temperature probe disposed in the at least one slot and configured to sense a temperature of the at least one corresponding wire, the at least one wire temperature probe being connected to a communication cable; at least one ambient temperature probe configured to sense an ambient temperature associated with the slotted assembly; and at least one connector disposed on an end of the communication cable configured to connect the at least one wire temperature probe and the at least one ambient temperature probe to a computing device.

In some embodiments, the body further includes a plurality of slots disposed on the side of the body associated with corresponding wires, each of the plurality of slots being configured to engage with a respective one of the corresponding wires. In some embodiments, the body further includes a plurality of wire temperature probes, each wire temperature probe being disposed in a corresponding slot of the body. In some embodiments, the body is configured to engage a linear wire arrangement associated with the at least one corresponding wire. In some embodiments, the body is configured to engage a curvilinear arrangement associated with the at least one corresponding wire. In some embodiments, the computing device is configured to receive, via the at least one connector, data from at least one of the at least one wire temperature probe and the at least one ambient temperature probe. In some embodiments, the computing device is further configured to determine, based on the data from at least one of the at least one wire temperature probe and the at least one ambient temperature probe, a condition of the at least one electrical breaker. In some embodiments, the computing device is further configured to generate an output indicating the condition of the at least one electrical breaker.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A monitoring system comprising:
an assembly including:
  a communication cable;
  a body comprising a thermally-insulating material and defining a slot configured to engage a load wire connected to an electrical breaker;
  a wire temperature probe disposed in the slot and configured to sense a temperature of the load wire, the wire temperature probe being connected to the communication cable;
  an ambient temperature probe connected to the communication cable and configured to sense an ambient temperature, wherein the ambient temperature probe is positioned such that the body thermally insulates the ambient temperature probe from the wire temperature probe; and
a computing device communicatively coupled to the wire temperature probe and the ambient temperature probe via the communication cable, the computing device including: a processor; and a memory including instructions that, when executed by the processor, cause the processor to:
  receive, via the communication cable, data indicating a temperature of the load wire and the ambient temperature;
  determine, based on the data, a condition of at least one of the electrical breaker; and
  generate an output indicating the condition of the electrical breaker.

2. The system of claim 1, wherein the body defines a plurality of slots, each of the plurality of slots being configured to engage a corresponding one of a plurality of load wires connected to the electrical breaker.

3. The system of claim 1, wherein the assembly further includes a plurality of wire temperature probes, each of the plurality of wire temperature probes being disposed in a corresponding one of the plurality of slots, each of the plurality of wire temperature probes configured to sense a temperature of the corresponding one of the plurality of load wires, and each of the plurality of wire temperature probes connected to the communication cable;

wherein the data comprises a temperature of each of the plurality of load wires.

4. The system of claim 3, wherein the plurality of wire temperature probes are connected to one another and to the communication cable in a daisy-chain configuration.

5. The system of claim 3, wherein the plurality of wire temperature probes are connected to one another and to the communication cable in a parallel configuration.

6. An apparatus for monitoring temperature, the apparatus comprising:

an assembly including:

a communication cable;

a body comprising a thermally-insulating material and defining a slot configured to engage a load wire associated with an electrical breaker;

a wire temperature probe disposed in the slot and configured to sense a temperature of the load wire, the wire temperature probe being connected to the communication cable;

an ambient temperature probe connected to the communication cable and configured to sense an ambient temperature, wherein the ambient temperature probe is positioned such that the body thermally insulates the ambient temperature probe from the wire temperature probe.

7. The apparatus of claim 6, wherein the body defines a plurality of slots, each of the plurality of slots being configured to engage a corresponding one of a plurality of load wires.

8. The apparatus of claim 6, wherein the apparatus further includes a plurality of wire temperature probes, each of the plurality of wire temperature probes being disposed in a corresponding one of the plurality of slots, each of the plurality of wire temperature probes configured to sense a temperature of the corresponding one of the plurality of load wires, and each of the plurality of wire temperature probes connected to the communication cable.

9. The apparatus of claim 6, wherein the body is configured to engage a linear wire arrangement associated with the load wire.

10. The apparatus of claim 6, wherein the body is configured to engage a curvilinear arrangement associated with the load wire.

11. The system of claim 3, wherein the body thermally insulates each of the plurality of wire temperature probes from each other of the plurality of wire temperature probes.

12. The apparatus of claim 8, wherein the body thermally insulates each of the plurality of wire temperature probes from each other of the plurality of wire temperature probes.

13. A monitoring system comprising:

a plurality of assemblies, each of the plurality of assemblies corresponding to one of a plurality of electrical breakers of an electrical panel, each of the plurality of assemblies configured to engage a plurality of load wires connected to the corresponding electrical breaker, each of the plurality of assemblies comprising:

a communication cable;

a body defining a plurality of slots respectively configured to engage the plurality of load wires;

a plurality of wire temperature probes respectively disposed in the plurality of slots and respectively configured to sense temperatures of the plurality of load wires, each of the plurality of wire temperature probes being connected to the communication cable;

an ambient temperature probe connected to the communication cable and configured to sense an ambient temperature; and a computing device communicatively coupled to the communication cable of each of the plurality of assemblies, the computing device comprising a processor and a memory comprising instructions that, when executed by the processor, cause the processor to, for each of the plurality of assemblies:

receive, via the corresponding communication cable, data indicating the temperatures of the corresponding plurality of load wires and the ambient temperature from the corresponding ambient temperature probe;

determine, based on the data a condition of the corresponding electrical breaker; and generate an output indicating the condition of the corresponding electrical breaker.

14. The system of claim 13, wherein each body of the plurality of assemblies comprises a thermally-insulating material which thermally insulates each of the plurality of wire temperature probes from each other of the wire temperature probes and from the ambient temperature probe.

\* \* \* \* \*